(12) United States Patent
Kamiya et al.

(10) Patent No.: US 8,344,723 B2
(45) Date of Patent: Jan. 1, 2013

(54) PHASE DIFFERENCE RESOLVER OF ESTIMATED REAL-TIME OUTPUT

(75) Inventors: Takumi Kamiya, Anjo (JP); Takehide Nakamura, Handa (JP); Tetsuji Inoue, Nagoya (JP); Hiroaki Miyazaki, Ichinomiya (JP); Takeshi Suzuki, Chita-gun (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 351 days.

(21) Appl. No.: 12/662,523

(22) Filed: Apr. 21, 2010

(65) Prior Publication Data
US 2010/0315075 A1    Dec. 16, 2010

(30) Foreign Application Priority Data

Jun. 15, 2009  (JP) .................................. 2009-142017
Nov. 9, 2009   (JP) .................................. 2009-255745

(51) Int. Cl.
*G01B 7/30* (2006.01)

(52) U.S. Cl. .............................. 324/207.25; 324/207.15

(58) Field of Classification Search ........................ None
See application file for complete search history.

(56) References Cited

U.S. PATENT DOCUMENTS

| | | | | | |
|---|---|---|---|---|---|
| 4,612,503 | A | * | 9/1986 | Shimizu et al. | 324/207.18 |
| 4,795,954 | A | * | 1/1989 | Sakurai et al. | 318/661 |
| 6,239,571 | B1 | * | 5/2001 | Shimahara | 318/605 |
| 7,174,270 | B2 | * | 2/2007 | Kokubo et al. | 702/151 |
| 7,603,250 | B2 | * | 10/2009 | Nishimoto et al. | 702/151 |
| 7,840,364 | B2 | * | 11/2010 | Nakazato | 702/58 |

FOREIGN PATENT DOCUMENTS

| | | |
|---|---|---|
| JP | A-62-144021 | 6/1987 |
| JP | B-3047231 | 3/2000 |
| JP | A-2000-292205 | 10/2000 |
| JP | A-2008-309736 | 12/2008 |

OTHER PUBLICATIONS

Chinese Office Action issued in Chinese Application No. 201010207831.8 dated Dec. 27, 2011 (with translation).

* cited by examiner

*Primary Examiner* — Vinh Nguyen
(74) *Attorney, Agent, or Firm* — Oliff & Berridge, PLC

(57) ABSTRACT

A phase difference type resolver is adapted such that a calculator calculates an angle from a phase difference at a detection-signal zero cross point, determines a velocity at the angle based on an angle calculated from a phase difference at a previous detection-signal zero cross point, calculates an estimated angle at a next detection-signal zero cross point based on the velocity, divides a difference between the estimated angle and the angle into predetermined minimum detection angles, and outputs a real-time signal based on the minimum detection angles in a range after the angle but before the estimated angle.

12 Claims, 12 Drawing Sheets

FIG. 14
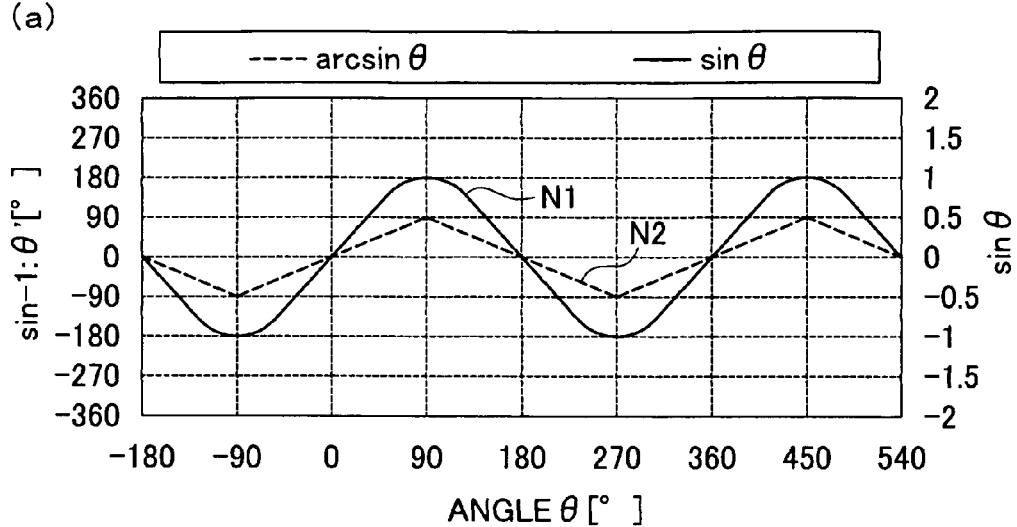
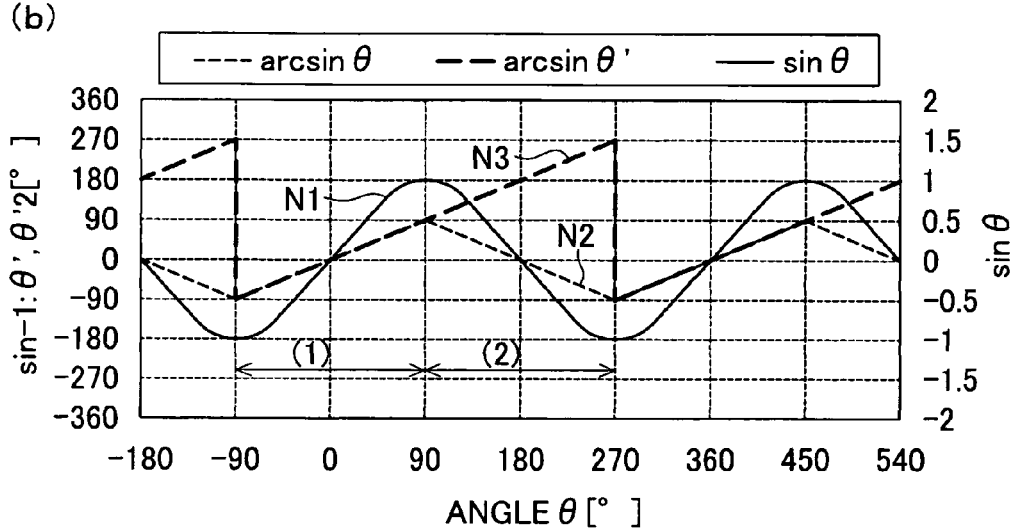

FIG. 15
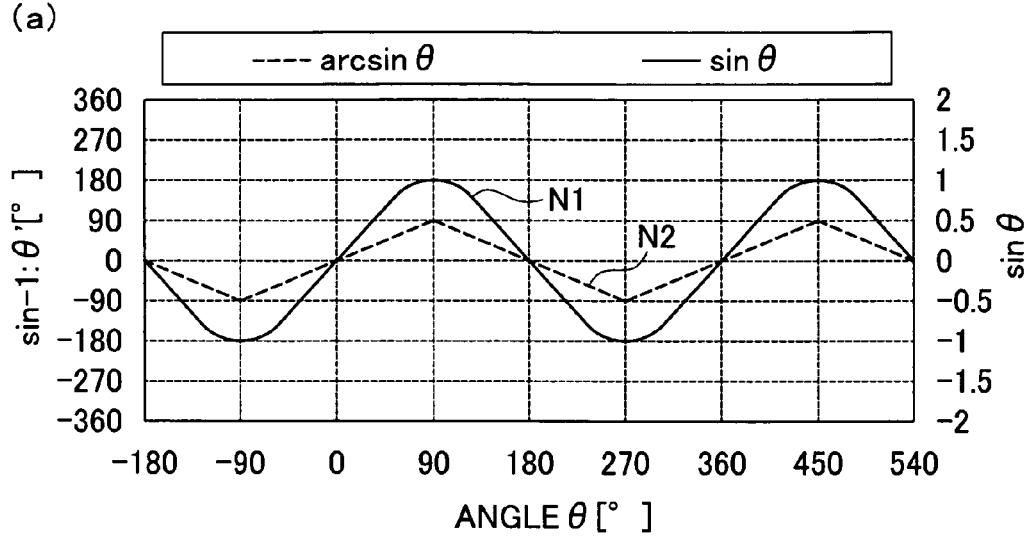
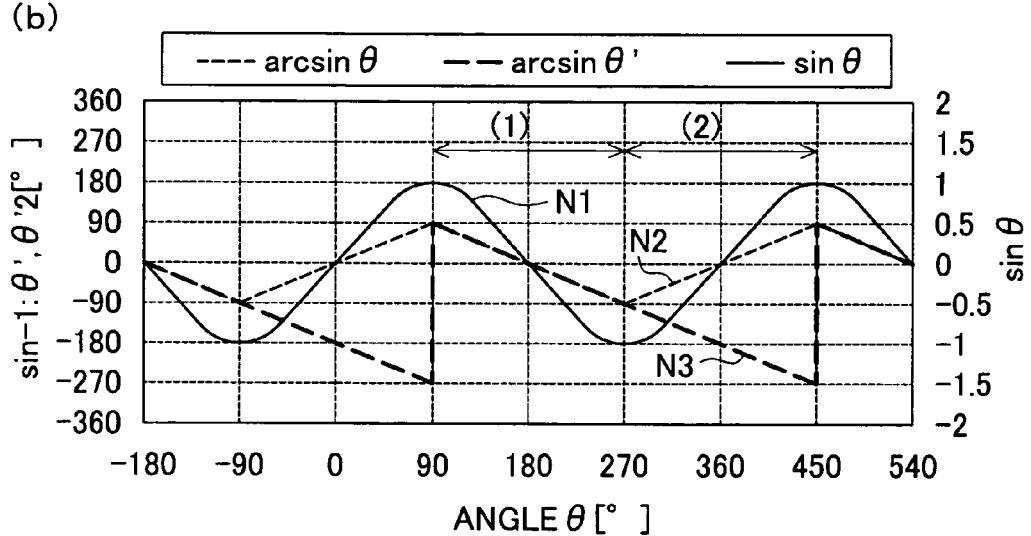

FIG.16

| | M(x-4) | M(x-3) | M(x-2) | M(x-1) | M(x) |
|---|---|---|---|---|---|
| PHASE DIFFERENCE (M) | | | | | |
| ANGLE (θ) | θ(x-4) | θ(x-3) | θ(x-2) | θ(x-1) | θ(x) |
| AVERAGE ROTATION VELOCITY (V') AT EACH RANGE | V'(x-3) = (θ(x-3) − θ(x-4))/(Tr+M(x-3) − M(x-4)) <br> V'(x-2) = (θ(x-2) − θ(x-3))/(Tr+M(x-2) − M(x-3)) <br> V'(x-1) = (θ(x-1) − θ(x-2))/(Tr+M(x-1) − M(x-2)) <br> V'(x) = (θ(x) − θ(x-1))/(Tr+M(x) − M(x-1)) | | | | |
| AVERAGE VELOCITY IN FOUR RANGES | V(x) = (V'(x-3) + V'(x-2)) + V'(x-1) + V'(x) /4 | | | | |
| AVERAGE VELOCITY IN ALL RANGES | V(x) = (θ(x) − θ(x-4)) / (4Tr+M(x) − M(x-4)) | | | | |

…
PHASE DIFFERENCE RESOLVER OF ESTIMATED REAL-TIME OUTPUT

CROSS-REFERENCE TO RELATED APPLICATIONS

This application is based upon and claims the benefit of priority from the prior Japanese Patent Applications Nos. 2009-255745 filed on Nov. 9, 2009 and 2009-142017 filed on Jun. 15, 2009, the entire contents of which are incorporated herein by reference.

TECHNICAL FIELD

The present invention relates to a resolver of a phase difference type including an excitation coil for receiving an excitation signal, a detection coil for outputting a detection signal, and a control unit for calculating an angular displacement based on a phase difference between the excitation signal and the detection signal.

BACKGROUND ART

Heretofore, a high-power brushless motor has been used in a hybrid electric vehicle and an electric vehicle. For control of such brushless motor mounted in the hybrid electric vehicle, it is necessary to precisely detect a rotation position of an output shaft of a motor. Because a rotation position of a rotor has to be accurately detected in order to control switching of energization to each coil of a stator. For a vehicle, particularly, there is a demand for reducing cogging that is apt to deteriorate drivability. Thus, accurate switching of energization to each coil is highly requested.

For detection of the location of a vehicle motor shaft, a resolver is used because of its performances such as high-temperature resistance, noise resistance, vibration resistance, and high-humidity resistance. The resolver is mounted in the motor and directly attached to the rotor shaft of the motor.

For instance, a resolver of Patent Literature 1 is arranged such that a high frequency wave is amplitude-modulated by a sine wave and a cosine wave. The amplitude-modulated high-frequency wave is input as an excitation signal to an excitation coil. This can provide an effect of reducing the number of windings of the excitation coil. Herein, the sine wave, the cosine wave, and the high-frequency wave are analog waves.

The control unit calculates an angular displacement based on a phase difference between a zero cross point of the excitation signal input to the excitation coil and a zero cross point of a detection signal output from a search coil.

CITATION LIST

Patent Literature

Japanese Patent No. 3047231 (U.S. Pat. No. 6,239,571 B1)

SUMMARY OF INVENTION

Technical Problem

However, the conventional phase difference type resolver has the following disadvantages.

The conventional phase difference type resolver includes the excitation coil which receives the excitation signal and the detection coil which outputs the detection signal and calculates the angular displacement based on the phase difference between the zero cross point of the excitation signal of the excitation coil and the zero cross point of the detection signal of the detection coil. Accordingly, it could detect the angular displacement only at the periods of the excitation signal and hence it is unadaptable for the case where higher resolution is demanded.

For instance, assuming that an excitation signal of 7.2 kHz is used, when the motor rotation number is 3000 rpm, the angular velocity is 18000 degrees)(°) per second. Thus, a detectable minimum angle is $18000/7200 = 2.5°$.

The present invention has been made to solve the above problems and has a purpose to provide a resolver of a phase difference type adaptable for detecting angular displacement for which high resolution is required.

Solution to Problem (1) To achieve the above purpose, one aspect of the invention provides a phase difference resolver comprising: an excitation coil for receiving an excitation signal, a detection coil for outputting a detection signal, and a control unit for calculating an angular displacement based on a phase difference between an excitation-signal zero cross point of the excitation coil and a detection-signal zero cross point of the detection coil, wherein the control unit determines a velocity at an angle calculated from a phase difference at a detection-signal zero cross point, the velocity being determined based on the angle and an angle calculated from a phase difference at a previous detection-signal zero cross point, calculates an estimated angle at a next detection-signal zero cross point based on the velocity, divides a difference between the estimated angle and the angle into predetermined minimum detection angles, and outputs a real-time signal based on the minimum detection angles in a range after the angle but before the estimated angle.

(2) Furthermore, another aspect of the invention provides a phase difference resolver comprising: an excitation coil for receiving an excitation signal, a detection coil for outputting a detection signal, and a control unit for calculating an angular displacement based on a phase difference between an excitation-signal zero cross point of the excitation coil and a detection-signal zero cross point of the detection coil, wherein the control unit calculates an excitation signal angle from a value of the excitation signal at time, calculates a detection signal angle from a value of the detection signal at the time, and estimates a current angle based on a difference between the excitation signal angle and the detection signal angle.

Advantageous Effects of Invention

With the above configuration (1), the angular displacement to the next zero cross point can be output every short elapsed time based on the velocity which is the immediately previous rate of angle change. It is therefore adaptable in real time to even the case of requiring high resolution.

According to the invention, for example, the use of the minimum detection angle $\theta_{LSB=0.0879}°$ can provide a resolution about twenty-eight times $(2.5/0.0879)$ higher than a resolution of $2.5°$ (the number of motor revolutions is 3000 rpm) obtained in the case of using only the zero cross points.

With the above configuration (2), the angular displacement can be estimated not only at the zero cross points but also at any time.

BRIEF DESCRIPTION OF DRAWINGS

FIG. 14 is a graph showing a first correcting method;

FIG. 15 is a graph showing a second correcting method; and

FIG. 16 is a table showing a speed calculation method in a third embodiment.

DESCRIPTION OF EMBODIMENTS

Figure 1:
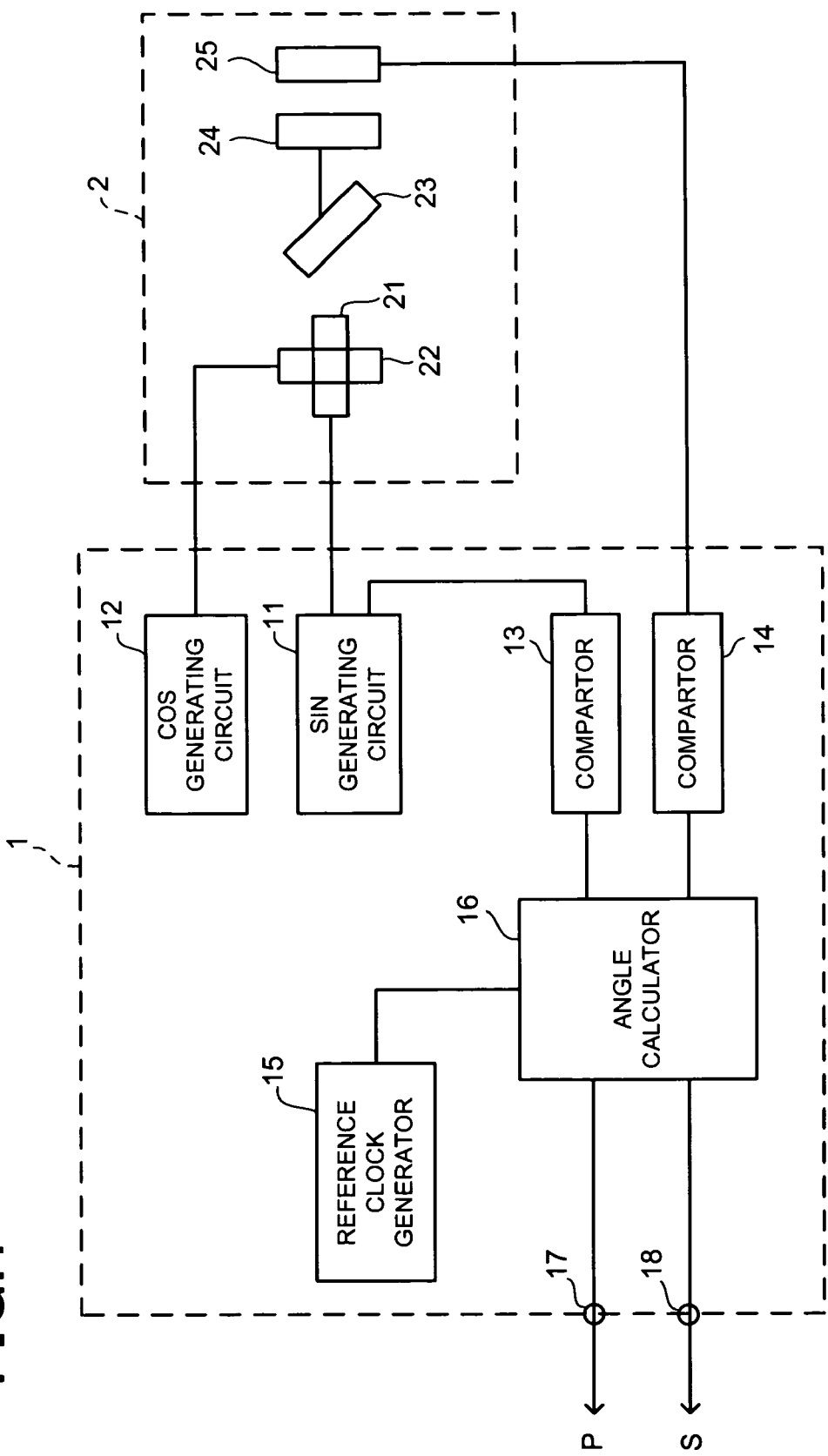
FIG. 1 is a block diagram showing a configuration of a phase difference type resolver in an embodiment of the invention.

A detailed description of a first preferred embodiment of a resolver of a phase difference type embodying the present invention will now be given referring to the accompanying drawings. As shown in FIG. 1, the phase difference type resolver mainly includes a sensor section 2 and a control section 1.

A sine wave generating circuit 11 for generating a sine wave R1 (A sin ωt) of 7.2 kHz which is a first excitation signal is connected to a first excitation coil 21 of a resolver stator. A cosine wave generating circuit 12 for generating a cosine wave R2 (A cos ωt) of 7.2 kHz which is a second excitation signal is connected to a second excitation coil 22 of the resolver stator. The sine wave and the cosine wave are equal in amplitude but shifted or displaced in phase by 90°.

In a detection coil 23, an output signal K, i.e., AB sin(ωt+θ) is generated as an induced current. The output signal K is input to a comparator 14 placed in a stator through rotary transformers 24 and 25. On the other hand, a sine wave (A sin ωt) is transmitted from the sine wave generating coil 11 to a comparator 13. Outputs of the comparators 13 and 14 are input to the angle calculator 16. Furthermore, output of a reference clock generator 15 is input to the angle calculator 16.

Figure 3:
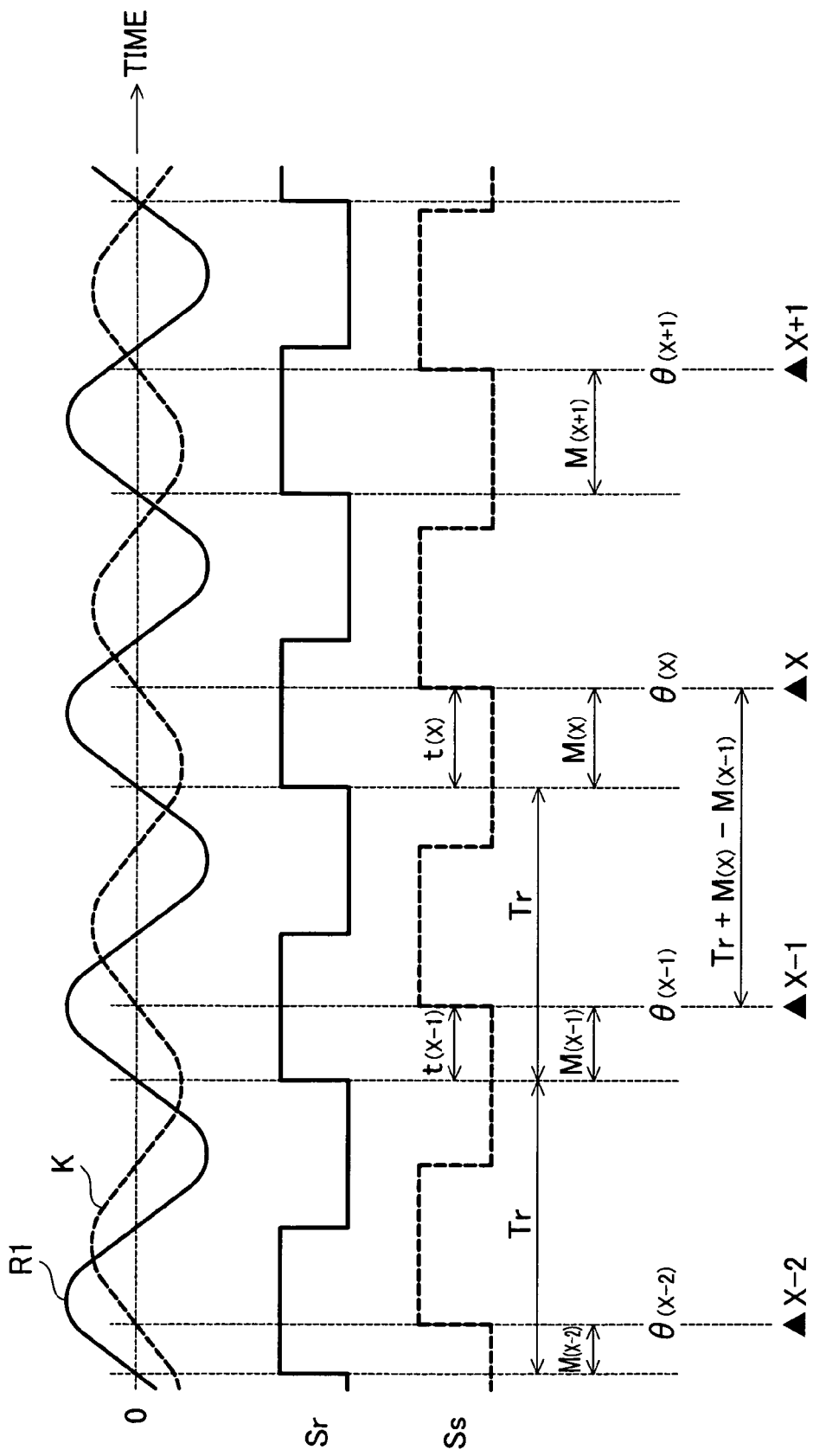
FIG. 3 is a chart showing signals in the phase difference type resolver.

Operations of the resolver configured as above will be explained below. FIG. 3 shows graphs showing waveforms of signals generated in the resolver. In the graphs, a lateral axis indicates time and a vertical axis indicates amplitude.

When the first excitation coil 21 is excited with the sine wave R1 (A sin ωt) and the second excitation coil 22 is excited with the cosine wave R2, the output signal K, i.e., AB sin(ωt+θ) is generated as an induced current in the detection coil 23 of a resolver rotor. An upper graph in FIG. 3 shows a relationship between the sine wave R1 and the output signal K.

The output signal K is transmitted to the comparator 14 placed in the stator through the rotary transformers 24 and 25.

On the other hand, the sine wave R1 (A sin ωt) is transmitted from the sine wave generating circuit 11 to the comparator 13. Based on a time deviation (a phase difference M) between the timing of detecting the zero-crossing of the sine wave R1 (A sin ωt) which is an excitation signal to be detected by the comparator 13 and the timing of detecting the zero-crossing of the output signal K (AB sin(ωt+θ)) to be detected by the comparator 14, an angle calculator 16 calculates a rotation angle of a motor rotor. The zero-crossing detection timing of the sine wave R1 detected by the comparator 13 is indicated by Sr in FIG. 3. The zero-crossing detection timing of the output signal K detected by the comparator 14 is indicated by Ss in FIG. 3. A time deviation between the zero-crossing detection timing of the sine wave R1 and the zero-crossing detection timing of the output signal K is a phase difference M. That is, the unit of the phase difference M is time.

The angle calculator 16 calculates the angular displacement based on the phase difference M and outputs a signal P representing the calculated angular displacement to an output port 17. The timing of outputting the angular displacement signal P to the output port 17 is almost the same as the zero cross point of the output signal K. In other words, the angle calculator 16 almost instantaneously calculates the angle and outputs the angular displacement signal P.

In the figure, "X" denotes a zero cross point of the detection signal K (hereinafter, "detection-signal zero cross point"), "X−1" denotes a detection-signal zero cross point one previous to X, "X−2" denotes a detection-signal zero cross point two previous to X, and "X+1" denotes a detection-signal zero cross point next to X. The detection-signal zero cross point X is sequentially changed. In other words, at the moment when the detection signal K reaches a next zero cross point, the previous detection-signal zero cross point X+1 is changed to the current detection-signal zero cross point X.

The phase difference $M_{(X)}$ indicates a phase difference at the detection-signal zero cross point X, and the angle $\theta_{(X)}$ indicates an angle at the detection-signal zero cross point X.

The angular displacement signal P is output only at almost the same periods as the sine wave R1 serving as the excitation signal. Accordingly, the angular displacement signal P alone could only provide low resolution of angular displacement. The excitation signal used in this embodiment is 7.2 kHz. For instance, when the number of motor revolutions is 300 rpm, the angular velocity is 18000° per second. For 7.2 kHz, therefore, a detectable minimum angle is merely 18000/7200=2.5°.

Figure 2:
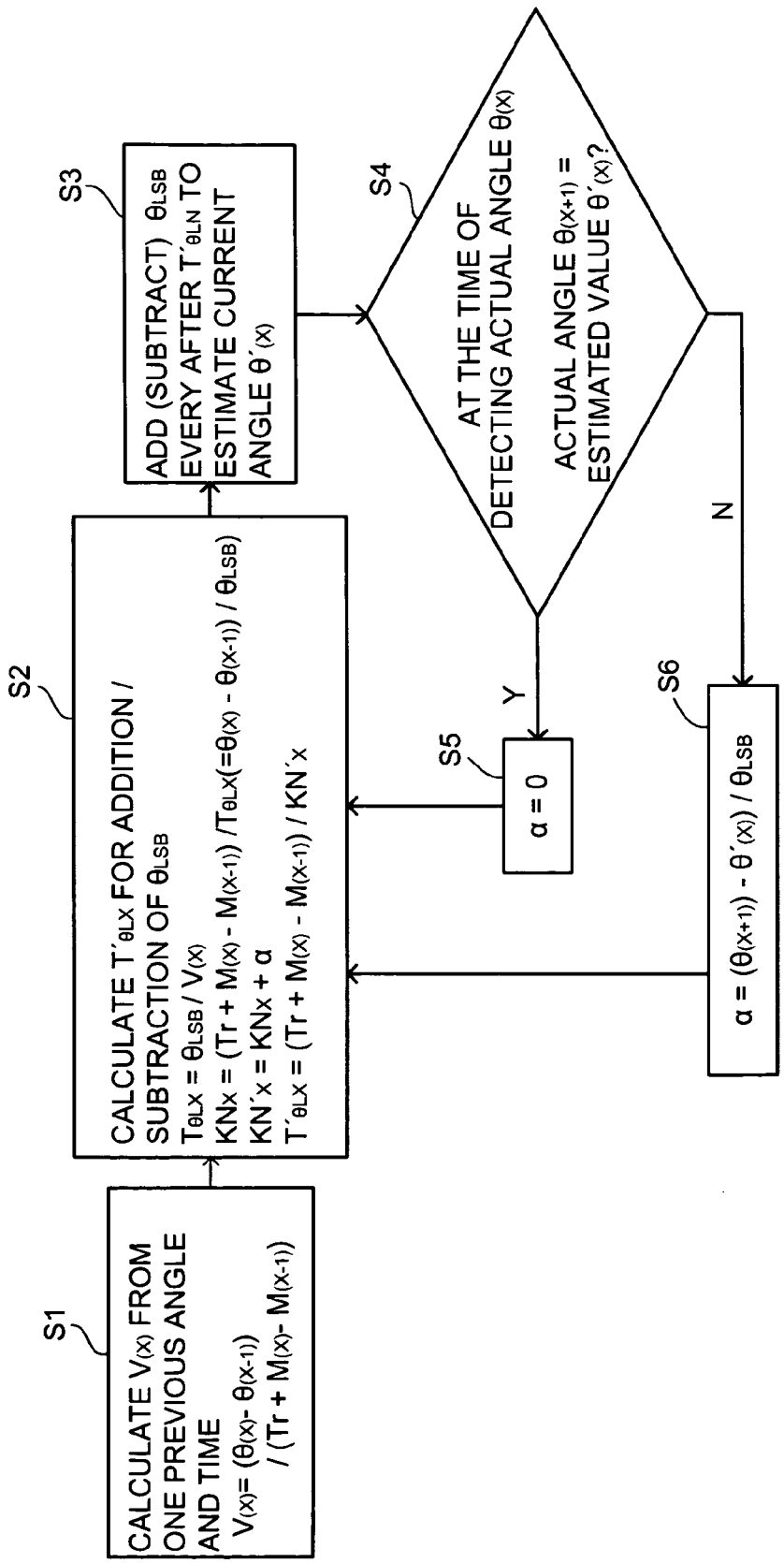
FIG. 2 is a chart showing an algorithm of a calculation method of estimating an angle.

In this embodiment, the angle calculator 16 estimates the angular displacement (a displacement angle) in process of the zero-crossing detection timing and outputs a real-time signal S representing the estimated angular displacement (the estimated displacement angle) to an output port 18. The real-time signal S is explained below. FIG. 2 shows an algorithm to calculate the real-time signal S.

A velocity $V_{(X)}$ is first calculated based on a previous (immediately preceding) angle and phase difference (S1):

$$V_{(X)} = (\theta_{(X)} - \theta_{(X-1)})/(Tr + M_{(X)} - M_{(X-1)})$$

where Tr is a period (time) of the excitation signal.

A time $T'_{\theta LX}$ for addition and subtraction of a minimum detection angle $\theta_{LSB}$ which is a resolution angle (S2). Herein, $T_{\theta LX}$ is a time for calculation to find the minimum detection angle $\theta_{LSB}$ which is a resolution angle, that is, $T_{\theta LX} = \theta_{LSB}/V_{(X)}$. An addition counter $KN_X$ is the number of outputs of angle change corresponding to the minimum detection angle $\theta_{LSB}$ at an angle detection period $Tr+M_{(X)}-M_{(X-1)}$ and is expressed by $KN_X = (Tr+M_{(X)}-M_{(X-1)})/T_{\theta LX}$ ($=(\theta_{(X)}-\theta_{(X-1)})/\theta_{LSB}$). A corrected counter $KN'_X$ is obtained by adding a later correction value to the addition counter and is expressed by $KN'_X = KN_X + \alpha$ ($\alpha$ is a correction value). At that time, $T'_{\theta LX} = (Tr + M_{(X)} - M_{(X-1)})/KN'_X$.

Next, a current estimated angle $\theta'$ (S3) is estimated by adding or subtracting the minimum detection angle $\theta_{LSB}$ every time $T'_{\theta LX}$ elapses.

When an actual angle $\theta_{(X)}$ is to be detected, if an error $\beta$ is absent between a calculated actual angle $\theta_{(X+1)}$ and an estimated angle $\theta'_{(X)}$ (S4: Yes), $\alpha=0$ is input in S2 (S5). When an error $\beta$ is present (S4: No), $\alpha=\theta'_{(X+1)}-\theta_{(X)})/\theta_{LSB}$ is input in S2 (S6). Herein, $\theta_{(X+1)}$ is an actual angle corresponding to an angle estimated at $\theta'_{(X)}$.

A concrete calculation method using the algorithm of FIG. 2 is explained below.

Figure 4:
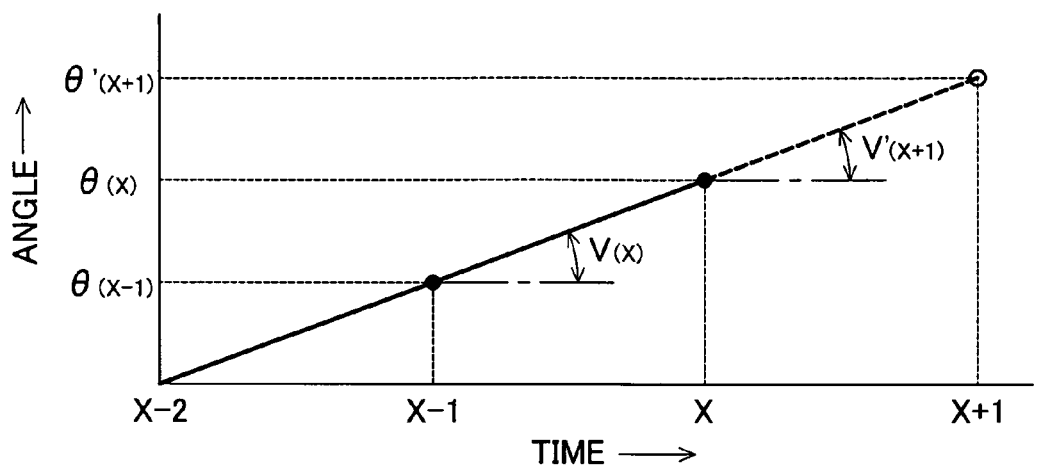
FIG. 4 is a first graph to explain a method of estimating an angle in process of zero cross detection timing.
Figure 5:
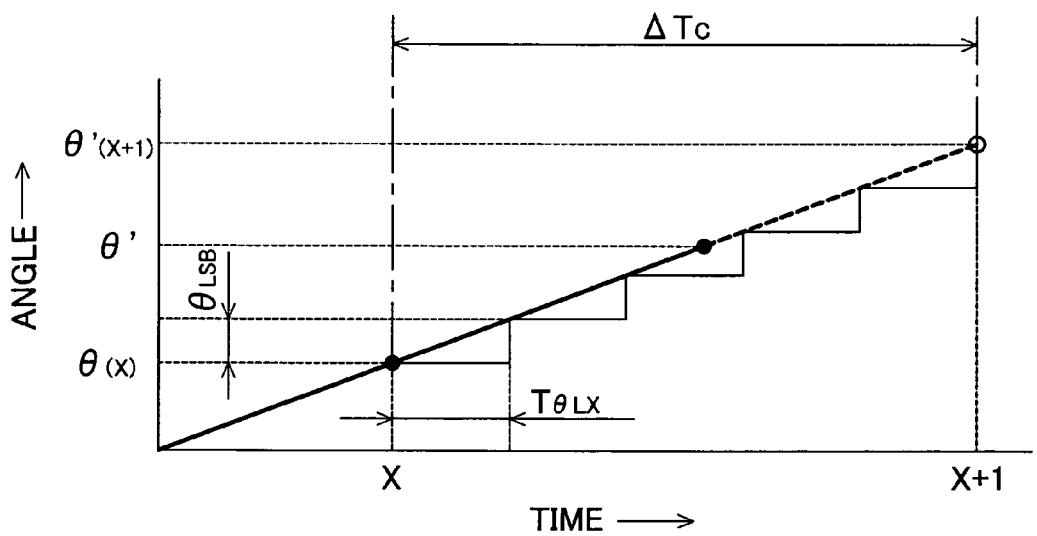
FIG. 5 is a second graph to explain the method of estimating the angle in process of zero cross detection timing.

FIGS. 4 and 5 are graphs showing a method of estimating an angle in process of the detection-signal zero-crossing detection timing. In each graph, a lateral axis indicates time and a vertical axis indicates angle.

In FIG. 4, an angle $\theta_{(X)}$ is an actually measured and calculated angle at a detection-signal zero cross point X. An angle $\theta_{(X-1)}$ is an actually measured and calculated angle at a detection-signal zero cross point X−1 immediately previous to the zero cross point X. An angle $\theta'_{(X+1)}$ is an estimated angle at a detection-signal zero cross point X+1 next to the zero cross point X. Each alphabetical sign attached with a dash represents an estimated value.

Tr is a period (time) of the excitation signal. A phase difference $M_{(X)}$ is a time deviation or difference (time) between the excitation signal R1 and the detection signal K at the detection-signal zero cross point X. A phase difference $M_{(X-1)}$ is a time deviation or difference (time) between the excitation signal R1 and the detection signal K at the detection-signal zero cross point X−1. An estimated phase difference $M'_{(X+1)}$ is an estimated phase difference at the detection-signal zero cross point X+1.

The angular displacement (displacement angle); $\theta_{(X)} - \theta_{(X-1)}$ is divided by the time; $Tr + M_{(X)} - M_{(X-1)}$ to determine an angular velocity $V_{(X)}$ at the detection-signal zero cross point X. In a range from the zero cross point X to the next zero cross point X+1, it is assumed that $V_{(X)}$ is changed at constant velocity. That is, it is assumed that an estimated velocity $V'_{(X+1)}$ is equal to $V_{(X)}$.

Next, a minimum detection angle $\theta_{LSB}$ is determined. In this embodiment, the accuracy is 12 bits. Thus, the minimum detection angle $\theta_{LSB}$ is 0.0879° obtained by dividing 360° by 2 raised to the 12th power, i.e., 4096.

The time $T_{\theta LX}$ needed for rotation by the minimum detection angle $\theta_{LSB}$ from the angle $\theta_{(X)}$ is calculated by $T_{\theta LX} = \theta_{LSB}/V_{(X)}$. Since the estimated velocity $V'_{(X+1)}$ is assumed as a constant velocity, as shown in FIG. 5, the minimum detection angle $\theta_{LSB}$ is added to (subtracted from) the angle $\theta_{(X)}$ every time the time $T_{\theta LX}$ elapses, thereby calculating a current estimated angle $\theta'$.

In this embodiment, in a time period $\Delta Tc$ from the zero cross point X to the zero cross point X+1, the angle calculator 16 calculates, as the current estimated angle $\theta'$, an angle obtained by adding (subtracting) the minimum detection angle $\theta_{LSB}$ to (from) the measured angle $\theta_{(X)}$ every time the time $T_{\theta LX}$ elapses and outputs it as the real-time signal S to the output port 18. Specifically, the real-time signal S is output at timings at which the angle is estimated to have changed by the minimum detection angle $\theta_{LSB}$.

At the time shown in FIG. 5, the estimated angle $\theta'$ is output as $\theta_{(X)} + 2\theta_{LSB}$.

According to the minimum detection angle $\theta_{LSB}$ in this embodiment, it is possible to obtain the resolution about twenty-eight times (2.5/0.0879) higher than the resolution of 2.5° (when the number of motor revolutions is 3000 rpm) obtained only at the zero cross point.

In this embodiment, the real-time signal S is output as an estimated angle calculated by adding the minimum detection angle $\theta_{LSB}$ to the measured angle $\theta_{(X)}$ at timings at which the angle is estimated to have changed by the minimum detection angle $\theta_{LSB}$, that is, every time a predetermined time $T_{\theta LX} = \theta_{LSB}/V_{(X)}$ elapses. Accordingly, a side receiving the detection signal can receive a current estimated angle every time the angle is estimated to have changed by the minimum detection angle $\theta_{LSB}$.

Herein, a real-time signal S may be output as a simple timing signal when the angle is estimated to have changed by the minimum detection angle $\theta_{LSB}$. In this case, the side receiving the real-time signal S counts the number of inputs, thereby knowing the estimated angle. Furthermore, the present embodiment uses the predetermined time $T_{\theta LX} = \theta_{LSB}/V_{(X)}$ as a method of estimating that the angle has changed by the minimum detection angle $\theta_{LSB}$. Alternatively, another more complicated calculation method may be used to enhance accuracy.

The following explanation is made on the case where an error occurs between the estimated angle $\theta'_{(X+1)}$ and an actually measured value.

Figure 6:
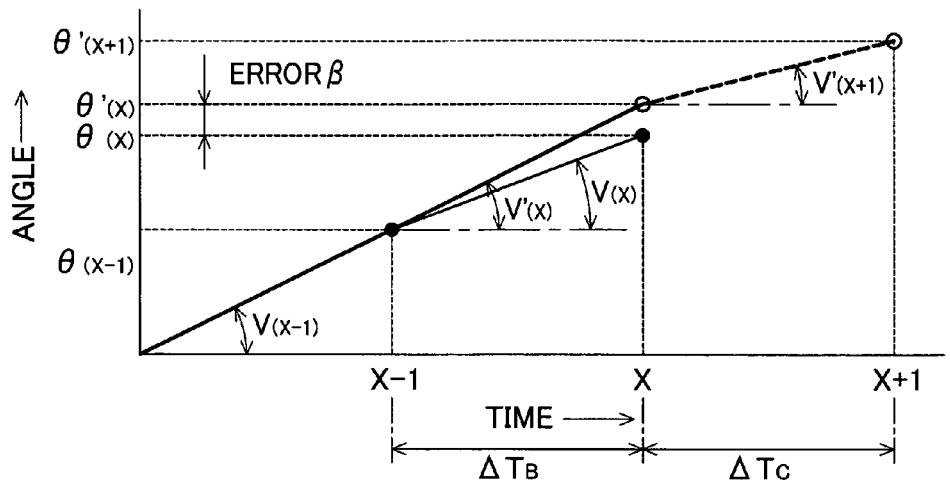
FIG. 6 is a graph showing a state after a lapse of a predetermined time from the time shown in FIG. 3, showing an estimated zero cross point in FIG. 3 comes to a measured zero cross point.

FIG. 6 is a graph showing a state after a predetermined time from the state of FIG. 4, showing that the estimated detection-signal zero cross point X+1 in FIG. 4 comes to the detection-signal zero cross point X of the actually measured value. In FIG. 6, the zero cross point X in FIG. 4 is indicated as a one-previous zero cross point X−1. The next estimated angle $\theta'_{(X+1)}$ in FIG. 4 is indicated as an estimated angle $\theta'_{(X)}$. FIG. 6 shows a case where an error $\beta$ is present between an angle $\theta_{(X)}$ actually measured at the zero cross point X and the estimated angle $\theta'_{(X)}$.

The error $\beta$ is observed at the time $T_{(X)}$ in FIG. 6. When the error $\beta$ is corrected on the resolver side immediately or within a short time, the control unit of the motor side is apt to consider the motor to be stopped or reversely rotating. Actually, the error $\beta$ occurs but the motor is normally rotated. However if the motor is judged to be reversely rotated, erroneous information is output.

To solve the above problems, the present embodiment adopts a method of gradually correcting the error $\beta$. To be concrete, while the estimated angle $\theta'_{(X)}$ is maintained, a next estimated angular velocity $V'_{(X+1)}$ is calculated based on the actually measured value $\theta_{(X)}$ to provide the estimated angular velocity $V'_{(X+1)} =$ the angular velocity $V_{(X)}$.

Figure 7:
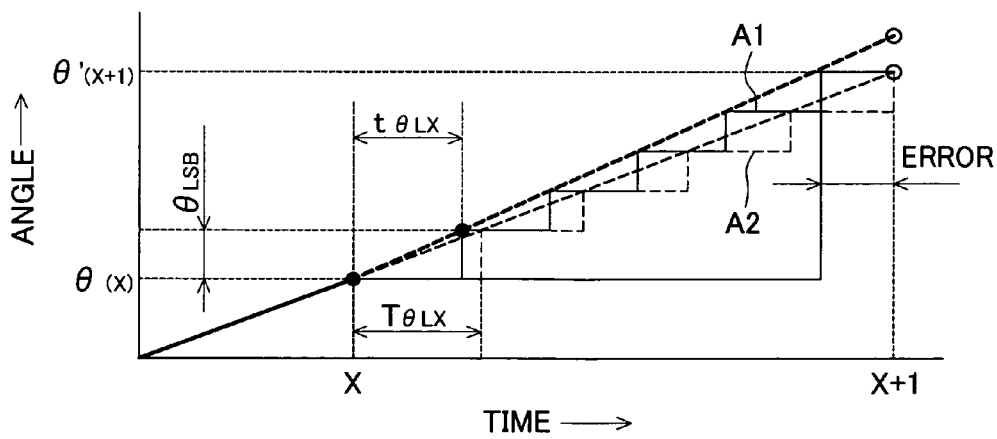
FIG. 7 is a graph showing a concrete method of correcting an error.

A method of reducing the error will be explained below. FIG. 7 shows a concrete method of reducing the error. Specifically, the error reduction is performed by correcting the timing of addition and subtraction of minimum detection angle $\theta_{LSB}$.

In an actual operation, the timing of addition/subtraction of the minimum detection angle $\theta_{LSB}$ is a period $t_{\theta LX}$ which is an integral multiple of the basic clock period (in this embodiment, the basic clock frequency is 30 MHz and hence the period is 33 ns). Accordingly, remainders left by dividing the time $T_{\theta LX}$ by the basic clock period are accumulated and become an error. Accordingly, an interval for adding or subtracting the minimum detection angle $\theta_{LSB}$ is extended by one basic clock period by the number of times corresponding to a value obtained by division of the error by the basic clock period so that the interval is expressed by $t_{\theta LX} + 1 CLK(33 ns)$. This can reduce the error. The timings at which the interval for adding or subtracting minimum detection angle $\theta_{LSB}$ is extended are uniformly allocated in balance, so that an output velocity of the detection signal can be approximated to an ideal velocity. In FIG. 7, a solid line A1 indicates a real-time signal including an error and a broken line A2 indicates an ideal real-time signal.

Figure 8:
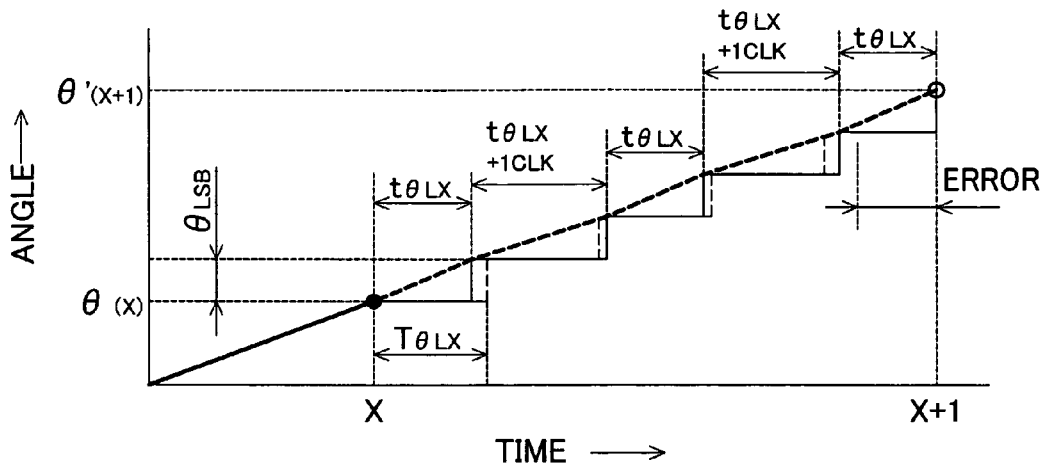
FIG. 8 is a graph showing an example of correcting an error.

For example, it is assumed that the addition/subtraction timing is controlled at five stages under the condition that the time period ΔTc is 102. This results in 102/5=20 leaving a remainder of 2. As shown in FIG. 8, of the five stages, the control is performed so that the period $t_{\theta LX}$ is 20CLK in three stages and the period $t_{\theta LX}$+1CLK is 21CLK in two stages. At that time, the two stages of $t_{\theta LX}$+1CLK are allocated between the three stages of $t_{\theta LX}$, so that the entire angular displacement can be uniformly balanced.

Figure 9:
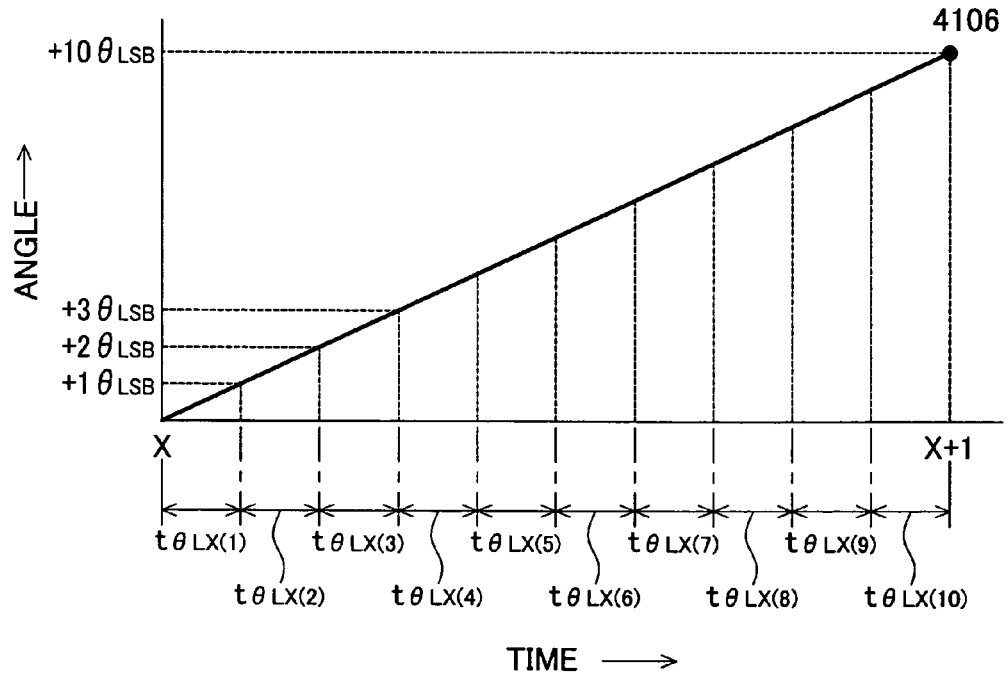
FIG. 9 is a graph showing another example of correcting an error.

FIG. 9 shows another example for error reduction. Specifically, as with FIG. 8, the timings of adding/subtracting the minimum detection angle $\theta_{LSB}$ are corrected to reduce an error.

In the method of FIG. 9, it is assumed that an angle change should be $10\theta_{LSB}$ for example from $T_{(X-1)}$ to $T_{(X)}$. In this embodiment, the minimum detection angle $\theta_{LSB}$ is determined as 360°/4096=0.0879°. Thus, in a time period ΔTc from the detection-signal zero cross point X to the estimated detection-signal zero cross point X+1, the angle calculator calculates a current estimated angle θ' by adding (subtracting) $\theta_{LSB}$ with respect to the angle $\theta_{(X)}$ every time the time $T_{\theta LX}$ passes. The current estimated angle θ' is thus output as a real-time signal S to the output port 18.

In this embodiment, the accuracy of angle output is 12 bits. One period (360° of the excitation signal is 360×12=4096 per unit of time (7324 Hz of excitation signal frequency with respect to 30 MHz (a period of 33 ns) of a basic clock frequency). Accordingly, one unit of time (a basic clock: 33 ns) corresponds to $1\theta_{LSB}$ (0.0879°. Herein, assuming that there is an angle change corresponding to $+10\theta_{LSB}$ from $T_{(X-1)}$ to $T_{(X)}$ (for example, the phase difference $M_{(X-1)}$=40 basic clocks and the phase difference $M_{(X)}$=50 basic clocks). Since Tr=4096 unit per time, it is estimated that $\Delta Tc(T_{(X-1)}-T_{(X)})=\Delta TB(T_{(X)}-T_{(X-1)})=Tr+M_{(X)}-M_{(X-1)}=4106$. Accordingly, it is necessary to output a signal representing that ten angle changes of $1\theta_{LSB}$ during 4106 basic clocks. In other words, 4106/10=410.6 and the angle can be estimated to change in steps of $1\theta_{LSB}$ every 410.6 basic clock. However, this is not an integral multiple of the basic clock period and such control is impossible. Herein, if a fractional portion, 0.6, is dropped and the angle is assumed to have changed in steps of $+1\theta_{LSB}$ every 410 basic clock, a real-time signal representing that the angle has changed by $10\theta_{LSB}$ is output at the time of 4100 basic clocks. This causes an error. This embodiment shows a method of reducing the above error occurrence.

An estimated time tθLX(1) in which the angle is changed by the minimum detection angle $\theta_{LSB}$ is set at 410 which is a value obtained by dropping the fractional portion of 4106/10=410.6. This embodiment uses as the basic clock having a frequency of 30 MHz and a period of 33 ns and thus the estimated time tθLX(1)=410*33 ns. Subsequently, an estimated time tθLX(2) in which the angle is changed by $2\theta_{LSB}$ is set at "410*33 ns" which is a value obtained by dropping the fractional portion of (4106/410)/9=410.6. An estimated time tθLX(3) in which the angle is changed by $3\theta_{LSB}$ is set at "410*33 ns" which is a value obtained by dropping the fractional portion of (4106−410*2)/8=410.7. An estimated time tθLX(4) in which the angle is changed by 4 $\theta_{LSB}$ is set at "410*33 ns" which is a value obtained by dropping the fractional portion of (4106−410*3)/7=410.8. An estimated time tθLX(5) in which the angle is changed by 5θLSB is set at "411*33 ns" which is a value obtained by dropping the fractional portion of (4106−410*4)/6=411.

The above calculation is sequentially performed by dropping the fractional portions to reduce errors. Thus, the errors can be easily reduced. The method shown in FIG. 8 has to previously determine the distribution according to the number of sections. On the other hand, the method shown in FIG. 9 can perform necessary error reduction simply by sequential calculations. Thus, the control thereof is easy.

Figure 10:
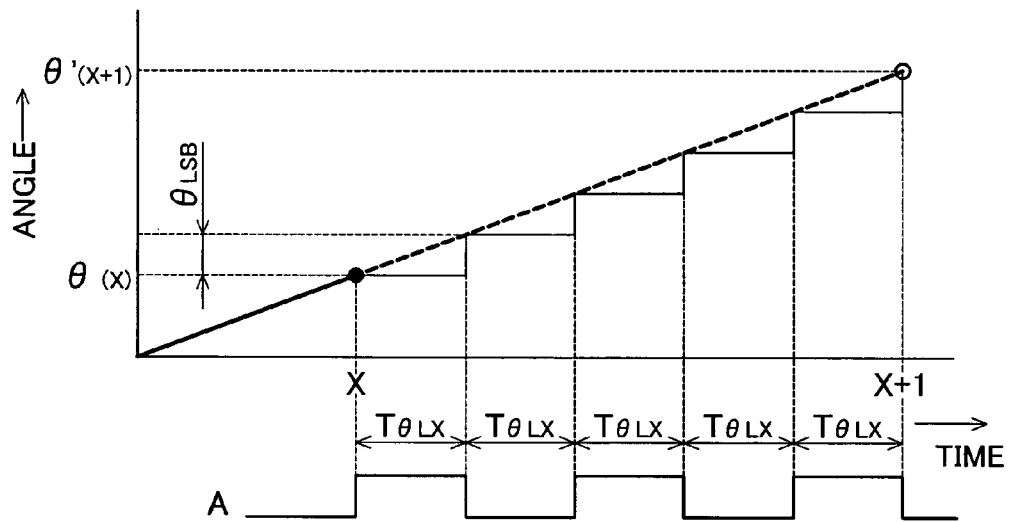
FIG. 10 is a graph showing a pulse signal to output a real-time signal.

Then, the angle calculator 16 calculates a current estimated angle θ' by adding (subtracting) the minimum detection angle $\theta_{LSB}$ to (from) the angle $\theta_{(X)}$ every time the time $T_{\theta LX}$ passes and outputs as a real-time signal S to the output port 18. Therefore, the angle calculator 16 internally generates a signal every time the time $T_{\theta LX}$ elapses. FIG. 10 is a graph showing a pulse signal for outputting the real-time signal S.

A pulse train A having on-time $T_{\theta LX}$ and off-time TθLX is generated in a period of time from the time $T_{(X)}$ at the zero cross point X to the estimated time $T_{(X+1)}$. In sync with rise and fall timings of the pulse train A, the minimum detection angle $\theta_{LSB}$ is added and the real-time signal S is output.

Figure 11:
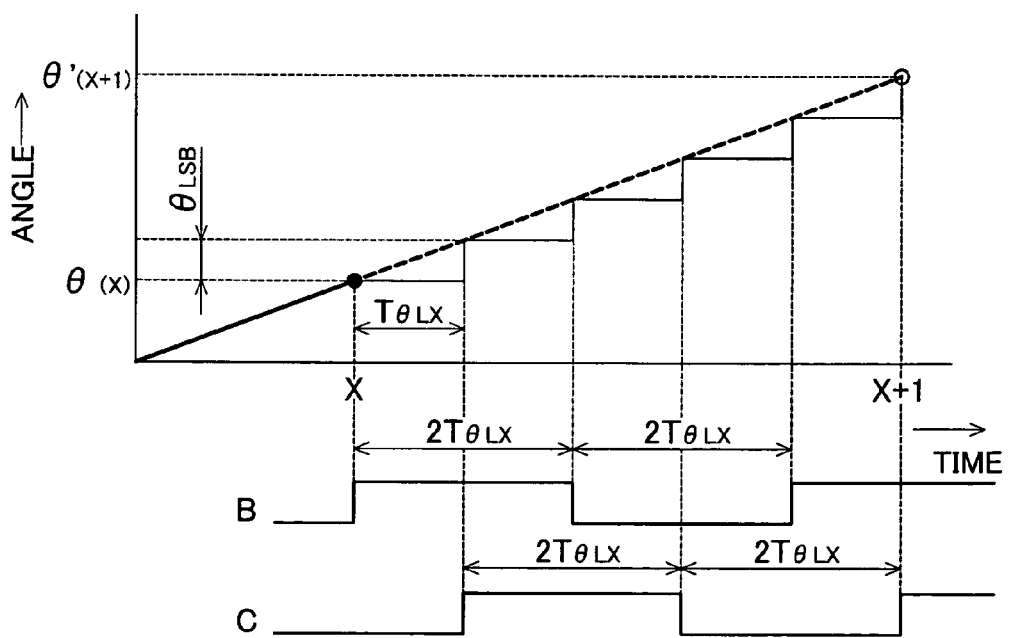
FIG. 11 is a graph showing another pulse signal to output a real-time signal.

As an alternative, two pulse trains B and C may be generated as shown in FIG. 11 instead of the single pulse train A. The pulse train B is generated from the time $T_{(X)}$ at the zero cross point X. On-time of the pulse train B is $2T_{\theta LX}$ and Off-time is $2T_{\theta LX}$. On the other hand, the pulse train C is generated with a delay of $T_{\theta LX}$ from the pulse train B. On-time of the pulse train C is $2T_{\theta LX}$ and Off-time is $2T_{\theta LX}$.

Using the two pulse trains B and C, angle output can be facilitated to detect angle and rotation direction. Specifically, by sequentially discriminating the order of rise and fall times of the two pulse trains, the rotation direction can be easily determined.

Since the minimum detection angle $\theta_{LSB}$ or the times $T_{\theta LX}, 2T_{\theta LX}$, and others corresponding to the integral multiple of the angle are generated in pulse trains as above, a current angle θ' can be output. In other words, when one or both of rising and falling of the pulse train are counted, a count value thereof represents an absolute angle. Thus, parallel output and serial output can exhibit a current absolute angle.

Figure 12:
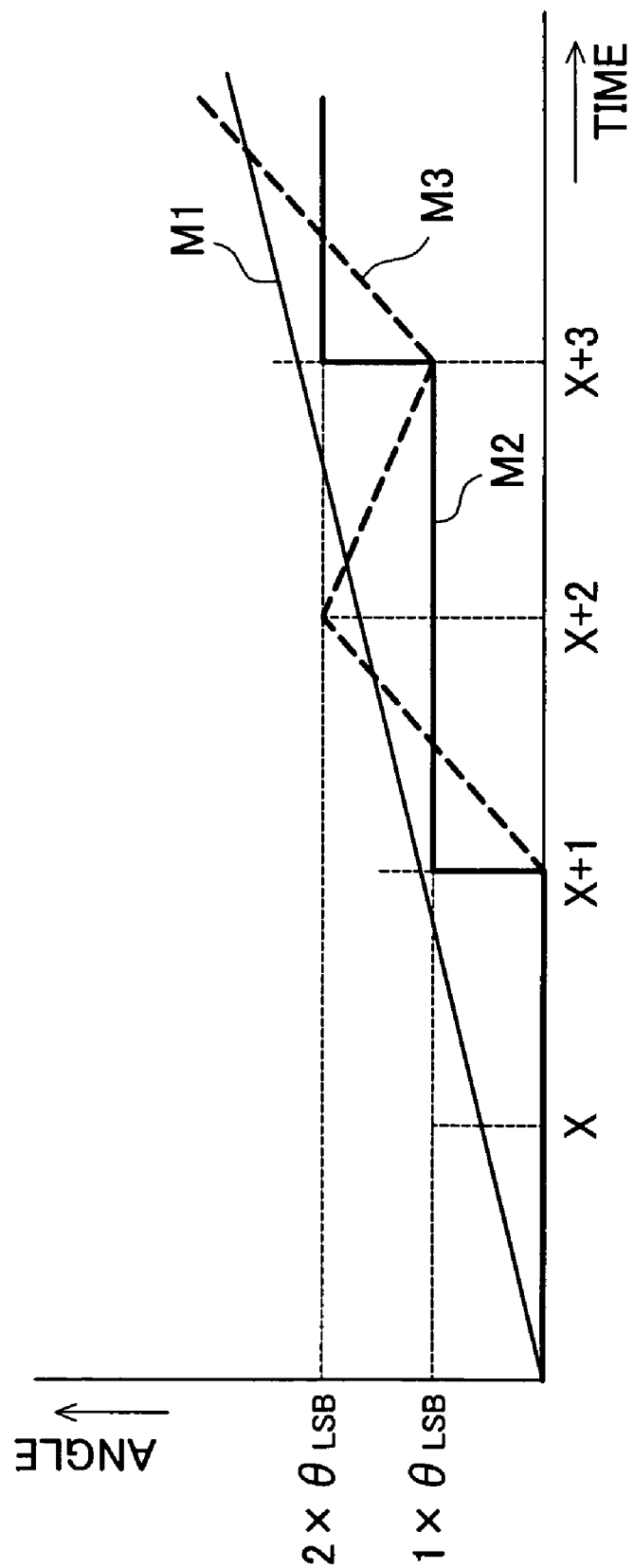
FIG. 12 is an explanatory view showing a case where no angle estimation is performed.

In this embodiment, only when the angle is changed by $2\theta_{LSB}$ or more in a period from the detection-signal zero cross point X−1 to the detection-signal zero cross point X, the angle estimation in real time is performed. When the angle is changed only by less than $2\theta_{LSB}$, no angle estimation is performed. FIG. 12 is a graph to explain the case where the angle estimation is not performed.

The reason why the angle estimation is not performed for the angle change of less than $2\theta_{LSB}$ is explained referring to FIG. 12. A vertical axis in the graph indicates angle and a lateral axis indicates elapsed time. A thin solid line M1 represents an actual angle change, a broken line M3 represents the case where the angle estimation is always performed, and a thick solid line M2 represents the case where the angle estimation is not performed when the angle is changed only by less than $2\theta_{LSB}$. As indicated by the solid line M1, the angle is slightly constantly changed with the passage of time.

When the angle estimation is always performed, an angle change of $\theta_{LSB}$ is measured at the time $T_{(X+1)}$ of a detection-signal zero cross point X+1. Based on that change, accordingly, the estimated angle $\theta'_{(X+2)}$ at a detection-signal zero cross point X+2 is estimated as $+2\theta_{LSB}$ as indicated by the broken line M3.

The angle measured at the time of zero cross point X+2 is less than the estimated angle $+2\theta_{LSB}$. At that time, accordingly, an estimated angle $\theta'_{(X+3)}$ at a detection-signal zero cross point X+3 is $+\theta_{LSB}$. This angle shows reverse rotation from the zero cross point X+2 to the zero cross point X+3 as shown in the figure; however, it is different from the actual angle change M1.

On the other hand, in the case of performing no estimation for the angle change of less than $2\theta_{LSB}$ in a period from the zero cross point X to the next zero cross point X+1, the angle θ is unchanged at the zero cross point X as indicated by the solid line M2 and then the angle θ is replaced with an actually measured value $+\theta_{LSB}$ at the zero cross point X+1. Simultaneously, the angle θ is unchanged at the zero cross point X+2 and then the angle θ is replaced with the actually measured value $+2\theta_{LSB}$ at the zero cross point X+3. According to this method, the angle is not changed to a negative angle and the control unit of the motor side does not erroneously detect that the motor is reversely rotated.

According to the phase difference type resolver of the first embodiment, as described above, there are included the excitation coils 21 and 22 to which the excitation signals are input, the detection coil 23 for outputting the detection signal, and the angle calculator 16 for calculating the angular displacement based on the phase difference between the zero cross points of the excitation signals to the excitation coils 21 and 22 and the zero cross point of the detection signal from the detection coil 23. The calculator 16 determines the velocity $V_{(X)}$ at the angle $\theta_{(X)}$ based on the angle $\theta_{(X)}$ calculated from the phase difference $M_{(X)}$ at the detection-signal zero cross point X and the angle $\theta_{(X-1)}$ calculated from the phase difference $M_{(X-1)}$ at the previous detection-signal zero cross point X−1. The calculator 16 calculates the estimated angle $\theta'_{(X+1)}$ at the next detection-signal zero cross point X+1 based on the velocity $V_{(X)}$, divides a difference between the estimated angle $\theta'_{(X+1)}$ and the angle $\theta_{(X)}$ into predetermined minimum detection angles $\theta_{LSB}$, and outputs a real-time signal based on the minimum detection angle $\theta_{LSB}$ in a range after the angle $\theta_{(X)}$ and before the estimated angle $\theta_{(X+1)}$. The angular displacement up to the next zero cross point can be output every time a short time elapses based on the velocity which is the immediately preceding rate of change in angle. Accordingly, the resolver of the present embodiment is applicable to even the angle detection requiring higher resolution.

For instance, it is assumed that the excitation signal of 7.2 kHz is used. In this case, the angular velocity is 18000° per second for a motor revolution speed of 3000 rpm. The 7.2 kHz signal could only provide a detectable minimum angle of 18000/7200=2.5°. This is the output from the output port 17.

In the present embodiment, the minimum detection angle $\theta_{LSB}$ of 0.0879° is used. Accordingly, as compared with the above case with the resolution of 2.5° (for the motor revolution speed of 3000 rpm) using only the zero cross points, for example, the present embodiment can provide an angular resolution of 2.5/0.0879, about twenty-eight times higher than the resolution of 2.5°.

Specifically, the real-time signal is output at the timing at which the angle is estimated to have changed by the minimum detection angle $\theta_{LSB}$. Since the real-time signal is output every time the angle is changed by the minimum detection angle $\theta_{LSB}$, accordingly, the angle change can be detected in real time.

Every time the predetermined time $T_{\theta LX}=\theta_{LSB}/V_{(X)}$ elapses, the real-time signal is output as the excitation angle determined by adding the minimum detection angle $\theta_{LSB}$. Accordingly, every time the minimum detection angle $\theta_{LSB}$ is changed, the estimated angle at that moment can be detected.

When the error β is present between the estimated angle $\theta'_{(X+1)}$ and the angle $\theta_{(X+1)}$ calculated based on the phase difference $M_{(X+1)}$ at the next excitation-signal zero cross point X+1, the velocity $V_{(X+1)}$ at the next zero cross point X+1 is calculated with a correction based on the error β. Even when the rate of angle change is suddenly changed, next estimated angular displacement is promptly corrected.

The interval of addition/subtraction of the minimum detection angle $\theta_{LSB}$ is an integral multiple of the basic clock of the angle calculator 16. Even though the accumulated reminders left by dividing the predetermined time $T_{\theta LX}$ by the basic clock become errors, these errors can easily be reduced.

Furthermore, the interval for adding/subtracting the minimum detection angle $\theta_{LSB}$ is extended by one period 1CLK of the basic clock by the number of times corresponding to a value obtained by dividing the error by the basic clock. It is therefore possible to reduce the error while ensuring balance.

To output the predetermined time $T_{\theta LX}$, a plurality of pulse trains are output. This can easily output the phase difference resolver.

The current angle calculation is not performed when the difference between the estimated angle $\theta'_{(X+1)}$ and the angle $\theta_{(X)}$ calculated based on the phase difference $M_{(X)}$ at the excitation-signal zero cross point X is a predetermined value or less. Even during low rotation, accordingly, it is not erroneously judged as reverse rotation.

A second embodiment of the invention will be described below. A basic structure of a resolver of a phase difference type in the second embodiment is identical to that in the second embodiment, which is as shown in FIG. 1. A difference is only the operations of the angle calculator 16. The following explanation is therefore focused on the difference and other parts are not repeatedly explained.

Figure 13:
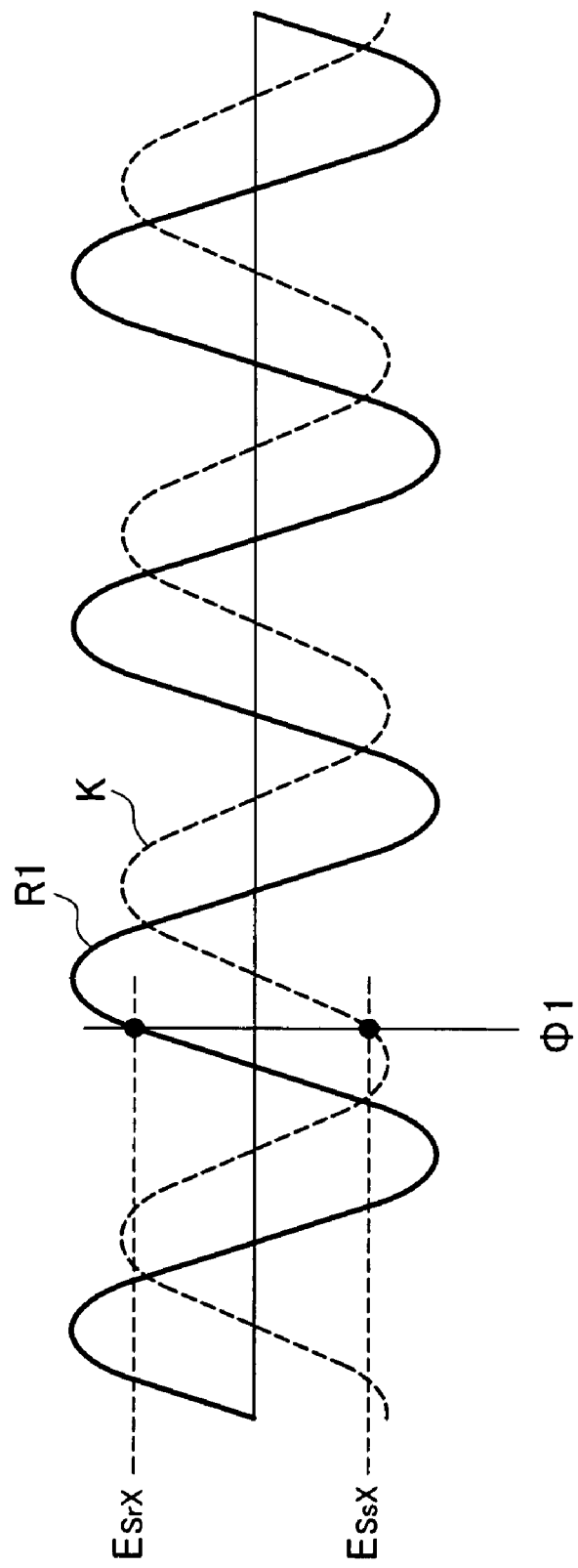
FIG. 13 is a chart showing a sine wave of an excitation signal and a detection signal.

FIG. 13 is a graph showing a sine wave R1 (α sin ωt) of an excitation signal and a detection signal K (αβ sin(ωt+γt)). A value of the sine wave R1 at an arbitrary measuring point Φ1 is referred to as $E_{SrX}$ and a value of the detection signal K is referred to as $E_{SsX}$ at the same point Φ1. Angular information $\theta_{SrX}$ of the excitation signal at the measuring point Φ1 is arcsin ($E_{SrX}/\alpha$) and angular information $\theta_{SsX}$ of the detection signal is arcsin ($E_{SsX}/(\alpha*\beta)$). This arcsine should be a value −90° or more and 90° or less. Thus, correction has to be conducted.

FIG. 14 is a graph showing a first correcting method, in which an upper graph (a) indicates data before correction and a lower graph (b) indicates the data after correction.

In the upper graph (a), a solid line N1 is a value of sin θ and a dotted line N2 is a value of arcsin θ. The data processing method in (a) is explained first. A calculation value arcsin θ' is set at −90° at a minimum value sin θ. (1) In a range where θ is −90° or more and 90° or less, a correction value θ'=θ. (2) In a range where θ is 90° or more and 270° or less, the correction value θ'=180−θ.

Thus, the data after correction shown in the lower graph (b) can be obtained. A thick broken line N3 indicates the data after correction. According to the corrected data N3, in an all range, arcsin is output in straight line, not in polygonal line.

FIG. 15 is a graph showing a second correcting method, in which an upper graph shows the data before correction and a lower graph shows the data after correction.

In the upper graph (a), a solid line N1 indicates a value of sin θ and a dotted line N2 indicates a data processing method shown in (a). A calculation value arcsin θ' is set at 90° at sin θ. (1) In the range of θ from 90° or more and 270° or less, a correction value θ'=θ. (2) In the range of θ from)−90° (270° or more and)90° (450° or less, the correction value θ'=−180−θ. Thus, the data N3 after correction shown in (b) can be obtained. According to the corrected data N3, in an all range, arcsin is output in straight line, not in polygonal line.

A resolver angle $\Phi_X$ at an arbitrary time is expressed by $\Phi_X=\theta'_{Sr1}-\theta'_{Ss1}$ (degrees). The resolver angle is always detected and a real-time signal S is output to the output port 18 every time the resolver angle $\Phi_X$ is added (subtracted) by the minimum detection angle $\theta_{LSB}$=0.0879°.

According to the phase difference type resolver in the second embodiment, as explained above in detail, there are provided the excitation coils 21 and 22 to which the excitation signals are input, the detection coil 23 for outputting the detection signal, and the angle calculator 16 for calculating the angular displacement based on the phase difference between the zero cross points of the excitation coils 21 and 22 and the zero cross point of the detection coil 23. Accordingly, the angle calculator 16 calculates the excitation signal angle $\theta'_{SrX}$ from the value of the excitation signal at the time T, calculates the detection signal angle $\theta'_{SsX}$ from the value of the detection signal at the time T, and estimates a current angle based on a difference between the excitation signal angle $\theta'_{SrX}$ and the detection signal angle $\theta'_{SsX}$. Accordingly, the angular displacement can be estimated at arbitrary time, without limiting to the zero cross point.

Furthermore, for calculating the detection signal angle $\theta'_{SsX}$, one period of the sine wave is divided by a predetermined number, and a value in process of the division is corrected by an elapsed time. Accordingly, the angular displacement can be calculated by simple calculation.

A third embodiment of the invention will be described below. The third embodiment is different from the first embodiment only in how to determine the velocity V(X), and other parts are identical to those in the first embodiment. The following explanation is therefore focused on the differences without repeating the same explanation.

FIG. 16 is a table showing how to determine the velocity V(X).

A velocity $V'_{(X-3)}$ in an interval (a range) from X-3 to X-4 ((X-4)-(X-3)) is determined by: $V'_{(X-3)}=(\theta_{(X-3)}-\theta_{(X-4)})/(Tr+M_{(X-3)}-M_{(X-4)})$.

A velocity $V'_{(X-2)}$ in an interval from X-2 to X-3 ((X-3)-(X-2)) is determined by: $V'_{(X-2)}=(\theta_{(X-2)}-\theta_{(X-3)})/(Tr+M_{(X-2)}-M_{(X-3)})$.

A velocity $V'_{(X-1)}$ in an interval from X-1 to X-2 ((X-2)-(X-1)) is determined by: $V'_{(X-1)}=(\theta_{(X-1)}-\theta_{(X-2)})/(Tr+M_{(X-1)}-M_{(X-2)})$.

A velocity $V'_{(X)}$ in an interval from X to X-1 ((X-1)-(X)) is determined by: $V'_{(X)}=(\theta_{(X)}-\theta_{(X-1)})/(Tr+M_{(X)}-M_{(X-1)})$.

An average velocity $V_{(X)}$ of the four intervals is determined by:

$$V_{(X)}=(V'_{(X-3)}+V'_{(X-2)}+V'_{(X-1)}+V'_{(X)})/(4Tr+M_{(X)}-M_{(X-4)}).$$

This $V_{(X)}$ is used as $V_{(X)}$ in the first embodiment.

Herein, as shown in a lower column in FIG. 16, the four intervals may be regarded as one so that an entire average velocity V(X) is calculated by: $V_{(X)}=(\theta_{(X)}-\theta_{(X-4)})/(4Tr+M_{(X)}-M_{(X-4)})$.

For calculation of an average of the four velocities V', in the present embodiment, the data of each velocity V' is 12 bits and hence a total value of four data is 14 bits. If an average is simply calculated, last 2 digits are dropped to form 12-bit data. In the present embodiment, a high-order digit of the last two digits is rounded up if it is 1, and down if it is O.

According to the third embodiment, for determining the velocity $V_{(X)}$, the velocity V' is determined at each of the plurality of previous zero cross points (in the third embodiment, e.g., four point or five points if including a current zero cross point) and an average value of them is set as the velocity $V_{(X)}$. When the velocity V' is largely changed, the estimated angle can be output in real time with high accuracy.

In the above embodiment, the velocity $V_{(X)}$ is determined from four zero cross points. As another alternative, the velocity $V_{(X)}$ may be determined from eight zero cross points to further increase the accuracy.

In the embodiment, the number of previous zero cross points is 4 or 8. This can facilitate the calculation with bits and make a simple program.

If the number of previous zero cross points is ten or more for detection of rotation angle of a motor, the following problems are concerned.

Specifically, if ten or more zero cross points are taken when rapid deceleration is performed while the motor is rotating at 10000 rpm or more, an error may exceed $1\theta_{LSB}$, so that an estimated value of the rapidly changing velocity $V_{(X)}$ cannot be estimated with accuracy. Taking ten or more zero cross points means the use of many data measured in the past. This may cause a problem that an error of the velocity to be estimated is larger as the velocity rapidly changes.

The present invention is not limited to the above embodiments and may be embodied in other specific forms without departing from the essential characteristics thereof.

For instance, in the above embodiment, the predetermined time $T_{\theta LX}=\theta_{LSB}/V_{(X)}$ is used to estimate the angle to have changed by the minimum detection angle $\theta_{LSB}$. Other calculating expressions may be adopted to estimate angle changes. Instead of estimating that the angle is changed by the minimum detection angle $\theta_{LSB}$, it may be arranged to calculate an estimated angle at constant time intervals and output the calculated estimated angle as a real-time signal S at the constant time intervals.

In the above embodiment, the accuracy is 12 bits. As an alternative, larger bits may be used to enhance the accuracy.

The above embodiment explains the case of the motor that is normally rotated. In the case of the motor that is reversely rotated, an estimated angle can be calculated by subtracting the minimum detection angle $\theta_{LSB}$.

While the presently preferred embodiment of the present invention has been shown and described, it is to be understood that this disclosure is for the purpose of illustration and that various changes and modifications may be made without departing from the scope of the invention as set forth in the appended claims.

REFERENCE SIGNS LIST

11 Sine wave generating circuit
12 Cosine wave generating circuit
13, 14 Comparator
16 Angle calculator
17, 18 Output port
21 First excitation coil
22 Second excitation coil
23 Detection coil
24, 25 Rotary transformer
X Zero cross point
M Phase difference
P Angular displacement signal
S Real-time signal
θ Angle
θ' Estimated angle
$\theta_{LSB}$ Minimum detection angle
β Error

The invention claimed is:

1. A phase difference resolver comprising:
an excitation coil for receiving an excitation signal,
a detection coil for outputting a detection signal, and
a control unit for outputting an estimated real-time angular signal based on a phase difference between an excitation-signal zero cross point of the excitation signal and a detection-signal zero cross point of the detection signal,
wherein the control unit is configured to detect angles at each detection-signal zero cross point from the phase difference between the detection signal and the excitation signal, estimate a velocity at an angle at a detection-signal zero cross point based on the angle and an angle at a previous detection-signal zero cross point, calculate an estimated angle at a next detection-signal zero cross point based on the velocity, divide a difference between the estimated angle and the angle by predetermined minimum detection angles, and output the estimated real-time angular signal changing by the minimum detection angles in a range after the angle but before the estimated angle.

2. The phase difference resolver according to claim 1, wherein
the control unit is configured to output the estimated real-time angular signal every time a predetermined time elapses.

3. The phase difference resolver according to claim 2, wherein
the estimated real-time angular signal represents an angle obtained by adding or subtracting the minimum detection angle to or from the angle.

4. The phase difference resolver according to claim 1, wherein
the control unit is configured to calculate an estimated angle every time an arbitrary time elapses and outputs as the estimated real-time angular signal at that timing.

5. The phase difference resolver according to claim 1, wherein
the control unit is configured to estimate the velocity by estimating velocities at a plurality of previous zero cross points, calculating an average of the velocities, and setting the average at the velocity.

6. The phase difference resolver according to claim 5, wherein
the control unit is configured to estimate the velocity using the velocities at immediate four or eight previous zero cross points.

7. The phase difference resolver according to claim 1, wherein
when an error is present between the estimated angle and an angle at a next excitation-signal zero cross point, the control unit is configured to calculate the velocity at the next excitation-signal zero cross point by correcting the velocity based on the error.

8. The phase difference resolver according to claim 1, wherein
the control unit is configured to output the estimated real-time angular signal changing with an interval which is an integral multiple of a basic clock of the control unit.

9. The phase difference resolver according to claim 8, wherein
the control unit is configured to extend the interval in which the minimum detection angle is added by one period of the basic clock, by the number of times corresponding to a value obtained by dividing the error by the basic clock.

10. The phase difference resolver according to claim 8, wherein
the control unit is configured to output a plurality of pulse trains to output a predetermined time.

11. The phase difference resolver according to claim 1, wherein
when a difference between the estimated angle and an angle calculated from a phase difference at the excitation-signal zero cross point is a predetermined value or less, the control unit is configured to perform no calculation on a current angle.

12. A phase difference resolver comprising: an excitation coil for receiving an excitation signal, a detection coil for outputting a detection signal, and a control unit for calculating a current angle based on a phase difference between an excitation-signal zero cross point of the excitation coil and a detection-signal zero cross point of the detection signal,
wherein the control unit is configured to calculate an excitation signal angle from a value of the excitation signal at time, calculate a detection signal angle from a value of the detection signal at the time, and calculate the current angle based on a difference between the excitation signal angle and the detection signal angle.

* * * * *